(12) United States Patent
Ralph et al.

(10) Patent No.: US 8,255,423 B2
(45) Date of Patent: Aug. 28, 2012

(54) ADAPTIVE RANDOM TREES INTEGER NON-LINEAR PROGRAMMING

(75) Inventors: Christopher Allan Ralph, Toronto (CA); Michael S. Sossi, San Francisco, CA (US); Stefan Kuzminski, New York, NY (US); Helen Geraldine E. Rosario, Ellington, CT (US); Yaxin Liu, Austin, TX (US)

(73) Assignee: Fair Isaac Corporation, Minneapolis, MN (US)

( * ) Notice: Subject to any disclaimer, the term of this patent is extended or adjusted under 35 U.S.C. 154(b) by 27 days.

(21) Appl. No.: 12/430,818

(22) Filed: Apr. 27, 2009
(Under 37 CFR 1.47)

(65) Prior Publication Data

US 2010/0287167 A1    Nov. 11, 2010

Related U.S. Application Data

(60) Provisional application No. 61/048,164, filed on Apr. 25, 2008.

(51) Int. Cl.
*G06F 7/00* (2006.01)

(52) U.S. Cl. ...................................... 707/797; 705/7.39

(58) Field of Classification Search .................. 707/797; 705/7.28, 7.39
See application file for complete search history.

(56) References Cited

U.S. PATENT DOCUMENTS

| | | | |
|---|---|---|---|
| 6,202,053 B1 * | 3/2001 | Christiansen et al. | 705/38 |
| 6,496,208 B1 * | 12/2002 | Bernhardt et al. | 715/853 |
| 2007/0226099 A1 * | 9/2007 | Senturk-Doganaksoy et al. | 705/35 |
| 2007/0255645 A1 * | 11/2007 | Morris et al. | 705/38 |
| 2007/0265863 A1 * | 11/2007 | Tien et al. | 705/1 |
| 2008/0103999 A1 * | 5/2008 | Peacock et al. | 706/15 |

* cited by examiner

*Primary Examiner* — Amy Ng
(74) *Attorney, Agent, or Firm* — Mintz Levin Cohn Ferris Glovsky and Popeo, P.C.

(57) ABSTRACT

A system and method for building segmented scorecards for a population is presented. A model of the population is built using a model builder computer, and one or more variables used by the model builder to build the model is stored in a repository. A scorecard is generated for each segment of the population based on the model and using an adaptive random tree computer program. Next, the scorecard for each segment is enhanced using a integer non-linear programming computer program to determine optimal score weights associated with the variables used by the model builder to build the model, and to generate an enhanced segmented scorecard for the population.

10 Claims, 5 Drawing Sheets

```
# Configure INLP Library object...
my_lib = Library(input_data,
        keep=['t001c_22_1_Inc', 't001c_38_7_Inc', 't002c_13_53_13_Inc', 'FALSCR', 't005c_47_13_1_Exc',
              't002c_2_22_8_Inc', 't002c_1_13_1_Inc', 't002c_6_36_7_Inc', 't003c_3_46_4_Inc',
              't003c_5_9_7_Inc', 't003c_5_47_0_Inc', 't005c_0_7_13_Exc', 't005c_1_7_12_Inc',
              't005c_47_13_1_Exc', 't006c_53_0_4_Inc', 't007c_5_32_5_13_Exc', 't007c_7_45_12_4_Exc',
              't009c_6_40_5_Inc', 't010c_36_5_4_Inc', 't010c_41_5_6_Inc', 't010c_41_12_9_Inc', 'FRAUDTAG',
              'SAMPWT'],
        performance = 'FRAUDTAG',
        weight = 'SAMPWT',
        principal_sets=('goods':(0,9),'bads':(1,)})

my_lib.set_bin_type('*', 'numeric')

for var in format_dict.keys():
    my_lib.add_format(label=var, format=format_dict[var], classing_type='coarse')

my_lib.set_tier('FALSCR',1)

my_lib.set_tier(['t001c_22_1_Inc', 't001c_38_7_Inc', 't002c_13_53_13_Inc', 'FALSCR', 't005c_47_13_1_Exc',
                 't002c_2_22_8_Inc', 't002c_1_13_1_Inc', 't002c_6_36_7_Inc', 't003c_3_46_4_Inc',
                 't003c_5_9_7_Inc', 't003c_5_47_0_Inc', 't005c_0_7_13_Exc', 't005c_1_7_12_Inc',
                 't005c_47_13_1_Exc', 't006c_53_0_4_Inc', 't007c_5_32_5_13_Exc', 't007c_7_45_12_4_Exc',
                 't009c_6_40_5_Inc', 't010c_36_5_4_Inc', 't010c_41_5_6_Inc', 't010c_41_12_9_Inc'],2)

my_lib.set_user_selected('FALSCR', True)
```

FIG. 3

```
# Configure INLP Scorecard object...
my_sc = Scorecard('sc', test_lib)

my_sc.variable_selection(auto_selection = False, selection_method = 'simultaneous', stay_significance_level = .005,
            tiers = [ ( .005, 'highest qualified'), (.005, 'highest qualified'), ( 999.99, 'highest qualified')])
```

FIG. 4

ADAPTIVE RANDOM TREES INTEGER NON-LINEAR PROGRAMMING

CROSS REFERENCE TO RELATED APPLICATIONS

This application claims the benefit of priority under 35 U.S.C. §119 to U.S. Provisional Patent Application Ser. No. 61/048,164, filed on Apr. 25, 2008, entitled, "Adaptive Random Trees Integer Non-Linear Programming," the entire disclosures of which is incorporated by reference herein.

BACKGROUND

This disclosure relates generally to search engines, and more particularly to an enhanced adaptive random tree framework to find segments of a population with different scorecard models containing locally optimized score weights.

Traditional manual techniques for segmenting a population, i.e. for dividing a population into pools of similar risks, for example, can involve a general process called "tree building." Tree building relates to organizing each member of the population according to a criteria, where branches are formed of members having similar departures from the criteria. Members of the population can be accounts, transactions, persons, etc.

The traditional techniques make branch-by-branch decisions. For instance, these techniques start with an entire population of accounts, and analyzes all the potential "splitter" variables (e.g. income, number of trade lines, average balance, etc.) to first find the one splitter that results in the greatest increase in divergence, i.e. "predictive power"—for the whole population. The best splits of the resulting subpopulations are sequentially determined "locally" down through the growing tree, using only the information from each subpopulation to be split. The subpopulations are iteratively divided until the leaf nodes contain too little data, i.e. consuming data until none is left.

These techniques overlook valuable information embedded in other parts of the tree, however. Analysts must then spend significant time evaluating all possible splits for each of the cascading series of subpopulations in an effort to improve the predictive power of the system.

SUMMARY

This document relates to scorecard technology using Adaptive Random Trees (ART) and Integer Non-Linear Programming (INLP). The ART-INLP system and method enables a tree search for the best segmented scorecard system with engineered and optimized models (aka: scorecards) in the leaf nodes.

In one implementation, a system for building segmented scorecards for a population is presented. The system includes a model builder computer for building a model of the population, and repository that stores one or more variables used by the model builder to build the model. The system further includes a scorecard computer in communication with the model builder computer. The scorecard computer is configured to execute an adaptive random tree computer program to generate a scorecard for each segment of the population based on the model, and to enhance the scorecard for each segment using a integer non-linear programming computer program to determine reactions of each segment to the one or more variables used by the model builder to build the model, and to generate an enhanced segmented scorecard for the population.

In another implementation, a method for building segmented scorecards for a population is presented. The method includes the steps of building a model of the population using a model builder computer, storing in a repository one or more variables used by the model builder to build the model, and generating a scorecard for each segment of the population based on the model and using an adaptive random tree computer program. The method further includes enhancing the scorecard for each segment using a integer non-linear programming computer program to determine optimal score weights associated with the variables used by the model builder to build the model, and to generate an enhanced segmented scorecard for the population.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIGS. 3 and 4 illustrate various aspects of configuring an ART-INLP system and method.

DETAILED DESCRIPTION

This document describes scorecard system and method having an enhanced ART framework and scorecard technology using Integer Non-Linear Programming (INLP) with Adaptive Random Trees (ART) genetic algorithm. The scorecard system and method enables a tree search for the best segmentation with engineered and optimized models (aka: scorecards) in the leaf nodes, to enable an analyst to pre-engineer segmented scorecards during a tree search process. In a preferred exemplary implementation, the scorecard system generates script-based (i.e. non-GUI) scorecards, which simplifies the process of building such scorecards.

Adaptive Random Trees (ART) is a technique that can be used for building decision trees with genetic algorithms. A genetic algorithm is a computer-implemented search technique and evolutionary algorithm, in which a population of abstract representations of candidate solution groups to a problem evolves toward better solutions. Rather than an acquisitive, hierarchical search process that makes splitting decisions one at a time on progressively smaller subsets of the data, a GA evolves populations of fully formed trees using an objective function that measures the "fitness" of the entire tree.

In general, ART works by building naïve Bayes scorecards in the leaf nodes of every tree in the population, and evolving the population of trees towards increasing system divergence of the resulting scores. This is a very powerful technique for developing scores, and tends to work much better than a score from a single model built on the entire population. The phrase "naïve Bayes" means that the score weights in ART are equal to the weights of evidence, which can be calculated from simple bin counts of the "goods" and "bads" from the population. ART is used to build segmented scorecard systems, in which a population is split into segments, each having a different model. The naïve Bayes approach provides a very good approximation of the score weights, and is very quick to calculate. Using INLP enables building engineered scorecards with optimized weights and different predictors.

Figure 1:
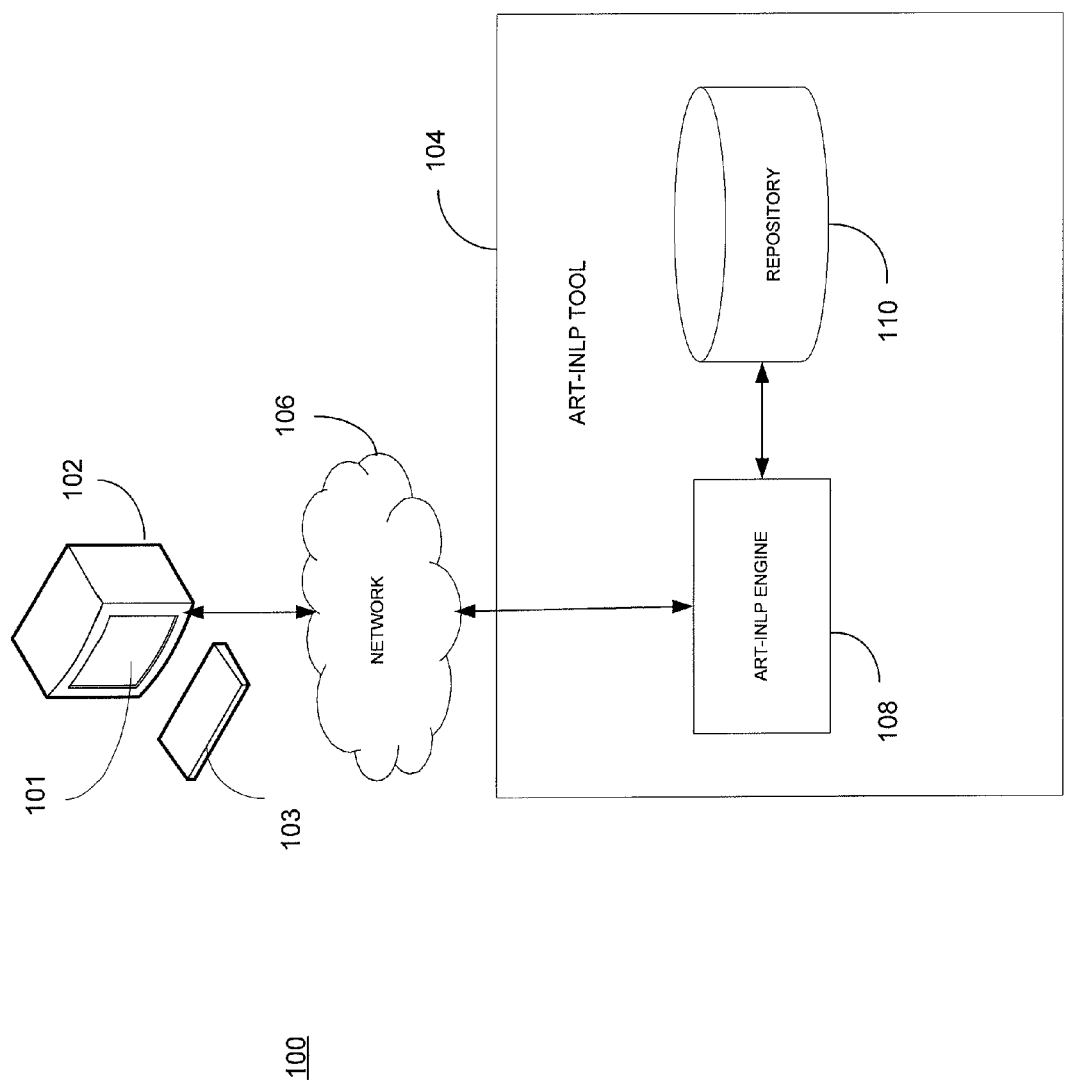
FIG. 1 depicts an exemplary scorecard system that executes an ART-INLP method.

FIG. 1 depicts an exemplary scorecard system 100 that executes an ART-INLP method. The scorecard system 100 preferably runs on a single computing system or machine, but may also be implemented in a distributed computing environment. One implementation of a distributed computing environment includes a client system 102 coupled to an ART-INLP tool 104 through a network 106 (e.g., the Internet, intranet or other type of network). The client system 102 can include a model builder program that models entire populations for risk management, account management, or other applications. The ART-INLP method can be integrated with the model builder program, as a plug-in or as a standalone application that interfaces with the model builder program.

The client system 102 and scorecard engine 104 may be implemented as one or more processors, such as a computer, a server, a blade, and the like. Further, the scorecard system 100 may be implemented on two or more client systems 102 that collaboratively communicate through the network 106. The scorecard engine 104 includes a repository 110 that holds information about the characteristics, or variables, that will go into a scorecard training process. The repository 110 includes physical storage media that stores the data, which data can be structured as a relational database or structured according to a metamodel.

The scorecard engine 104 further includes an ART-INLP engine 108 for executing an ART-INLP method, preferably using a genetic algorithm, to find segments of a population with different optimized scorecard models in each segment. The ART-INLP engine 108 is configured to generate a scorecard for each segment based on a model of the population.

The ART-INLP tool 104 can be implemented on a server. Alternatively, the portfolio segmentation tool can be implemented on a local client computer as an application program stored on a local memory and executed by a local general purpose processor. Further still, the ART-INLP tool 104 can be implemented as a distributed application accessible by a number of the client systems 102 via a network. Each client system 102 includes an output device 101 such as a computer display for displaying a graphical representation of an output of the scorecard system 100, and an input device 103 for receiving user input and instruction commands from a user.

Figure 2:
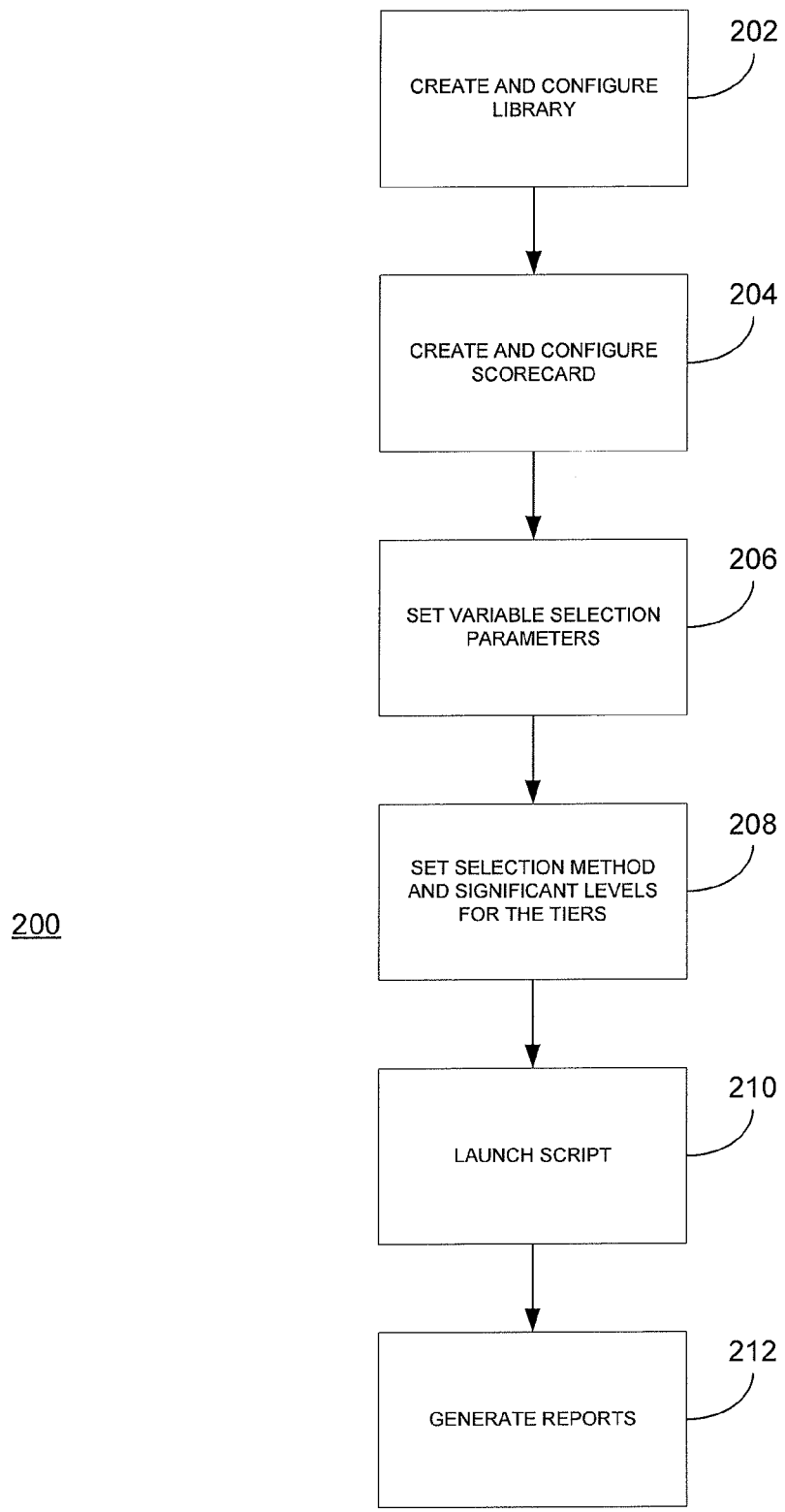
FIG. 2 is a flowchart of an ART-INLP method.

FIG. 2 is a flowchart of an ART-INLP method 200. First, at 202 a library is created and a library object is configured. The library is a repository that holds information about the characteristics, or variables, that will go into a scorecard training process. As shown in exemplary implementation illustrated in FIG. 3, a library called "my_lib" is created, in which the input data, keep variables, performance, sample weight, and principal sets are created. Then the bin types are set for the library. Formats can also be added, and tier one and tier two variables can be set. Finally, one or more variables can be selected to be included in the initial scorecards.

Next, at 204 a scorecard object is configured. In the example shown in FIG. 4, a scorecard object is created and called "my_sc" and refers to the library that has been created at 202. Next, variable selection parameters for the scorecard, which are attributes of the created scorecard object, are set at 206. At 208, the selection method can be set, as well as the significance levels for the tiers. To actually use the library and scorecard objects, their names are passed as parameters, and the scorecard system will replicate them in the leaf nodes and use the specified configurations when it calls out to the scorecard engine to actually build the models.

Figure 5:
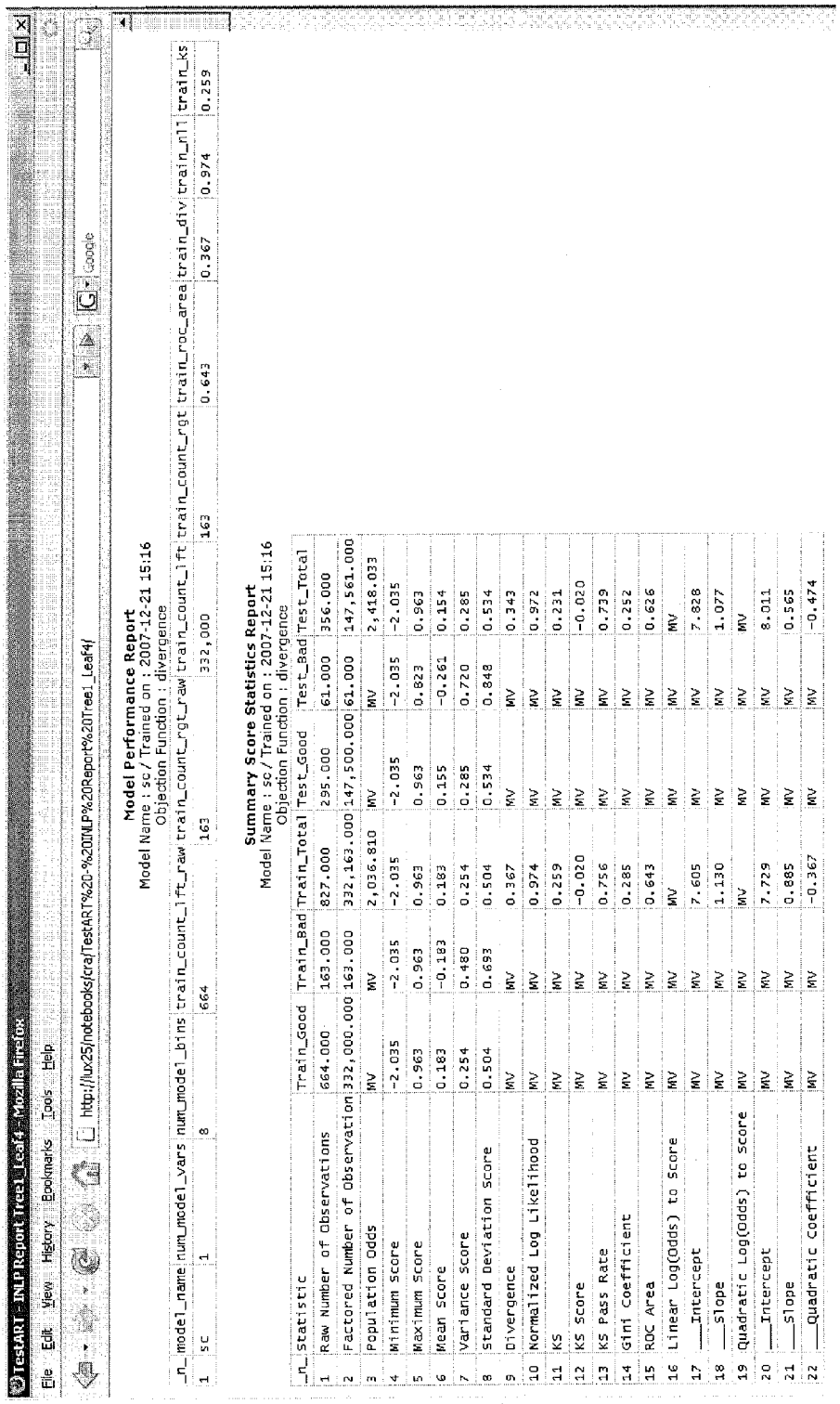
FIG. 5 shows a portion of an INLP training report in accordance with an exemplary implementation Like reference symbols in the various drawings indicate like elements.

Then, that script gets launched at 210, and when it is finished it generates a series of reports 212, preferably represented by .html links. The reports represent a scorecard, and can include a "Summary Stats Report" containing basic counts information associated with each tree, a "Tree Details Report" that shows the actual tree logic, a "Leaf Details Report" showing bin-level counts for the leaf node scorecards, and a series of "INLP Train Reports" that show details of the scorecards built in the leaf node of each tree. If the ART-INLP method is run in a script-based environment, to view these reports the analyst simply needs to copy and paste the .html links into a browser. FIG. 5 shows a portion of an INLP Training .html report in accordance with an exemplary implementation. Associated with this report would be the detailed counts and WOE pattern information for all the potential predictors.

The benefits of this new functionality include requiring much less time to develop the system of scorecards because the ART-INLP solution should be very close to the final solution. The analyst can control the variable selection process in the leaf node during the tree search, so there is no longer a need to develop a parent scorecard and pre-determine a specific set of variables to be included in the leaf models. The score weights are optimized, so the INLP scorecards will generate better predictions than the naïve Bayes scorecards. The analyst can restrict the score weight patterns in any of the predictor variables to ensure the final system satisfies any regulatory or policy-based constraints (i.e. satisfactory reason codes when making credit granting decisions).

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A system for building segmented scorecards for a population, the system comprising:
   a model builder computer for building a model of the population;
   repository that stores one or more variables used by the model builder to build the model; and
   a scorecard computer in communication with the model builder computer, the scorecard computer configured to execute an adaptive random tree computer program to generate a scorecard for each segment of the population based on the model, and to enhance the scorecard for each segment using an integer non-linear programming computer program to determine reactions of each segment to the one or more variables used by the model builder to build the model, and to generate an enhanced segmented scorecard for the population; and
   an output device having a display for displaying data representing the enhanced segmented scorecard, each enhanced segmented scorecard for a respective segment of the population being associated with a corresponding optimized score weight of a plurality of optimized score weights, the plurality of optimized score weights characterizing an optimization of score weights associated with the respective generated scorecard.

2. The system in accordance with claim 1, further comprising an input device coupled to the model builder computer for receiving input representative of the one or more variables for storage in the repository.

3. The system in accordance with claim 1, wherein the adaptive random tree computer program includes a script-based program and user interface.

4. The system in accordance with claim 2, wherein the input device is further adapted to receive input data defining the population.

5. The system in accordance with claim 1, wherein the population includes a plurality of accounts, and wherein the one or more variables include a risk associated with each of the plurality of accounts.

6. A method for building segmented scorecards for a population, the method comprising:

building a model of the population using a model builder computer; storing in a repository one or more variables used by the model builder to build the model;

generating a scorecard for each segment of the population based on the model and using an adaptive random tree computer program; and enhancing the scorecard for each segment using an integer non-linear programming computer program to determine optimal score weights associated with the variables used by the model builder to build the model, and to generate an enhanced segmented scorecard for the population; and outputting a representation of the enhanced segmented scorecard, each enhanced segmented scorecard for a respective segment of the population being associated with a corresponding optimized score weight of a plurality of optimized score weights, the plurality of optimized score weights characterizing an optimization of score weights associated with the respective generated scorecard.

7. The method in accordance with claim 6, wherein the adaptive random tree computer program is script-based.

8. The method in accordance with claim 6, wherein the population includes a plurality of accounts, and wherein the one or more variables include a risk associated with each of the plurality of accounts.

9. The method in accordance with claim 6, further comprising:

selecting the one or more variables during a search of a tree associated with the segmented scorecards.

10. A system for building segmented scorecards for a population, the system comprising:

a model builder computer for building a model of the population;

repository that stores one or more variables used by the model builder to build the model; and a scorecard computer in communication with the model builder computer, the scorecard computer configured to execute an adaptive random tree computer program to split the population into segments and generate a scorecard for each segment of the population based on the model, and to enhance the scorecard for each segment using a integer non-linear programming computer program to determine reactions of each segment to the one or more variables used by the model builder to build the model, and to generate an enhanced segmented scorecard for the population; and an output device having a display for displaying data representing the enhanced segmented scorecard, each enhanced segmented scorecard for a respective segment of the population being associated with a corresponding optimized score weight of a plurality of optimized score weights, the plurality of optimized score weights characterizing an optimization of score weights associated with the respective generated scorecard.

* * * * *